Aug. 21, 1956
R. HUBER
2,759,327
POWER PLANTS INCLUDING AT LEAST ONE GAS
TURBINE, IN PARTICULAR FOR VEHICLES
Filed Nov. 13, 1952
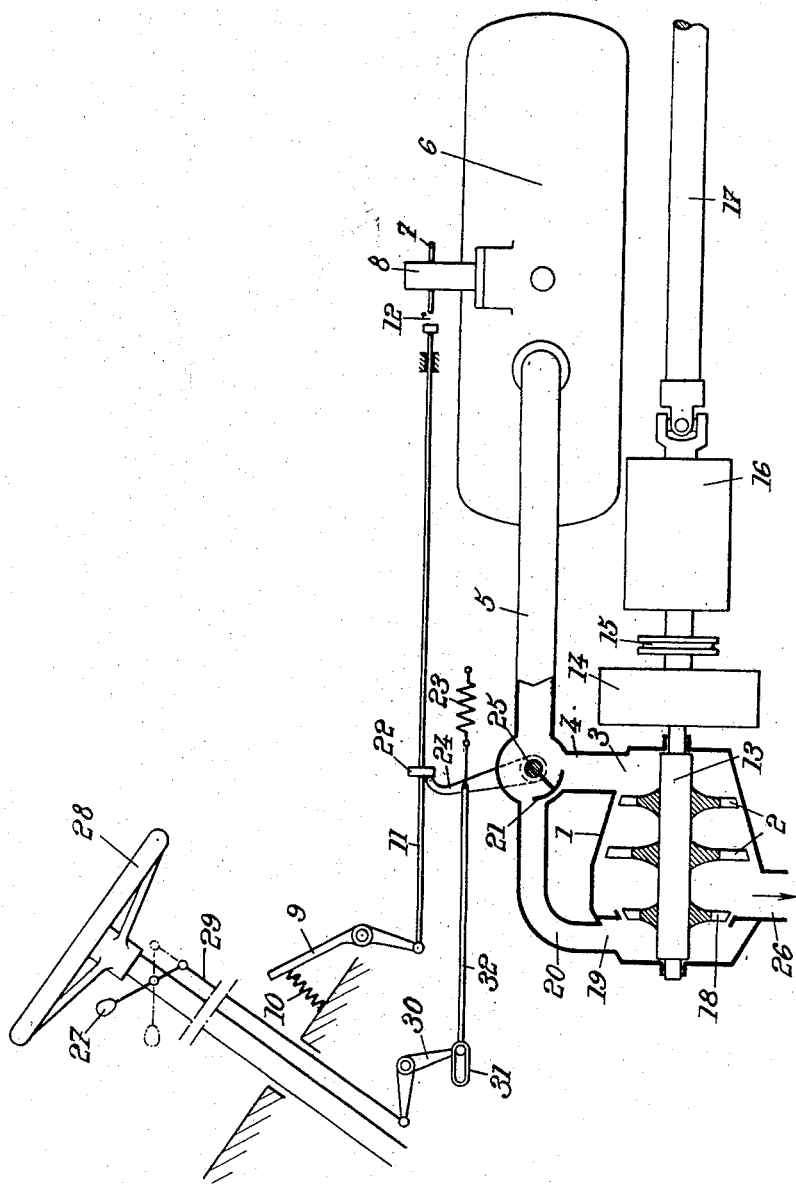
INVENTOR
ROBERT HUBER
BY
Bailey, Stephens & Huettig
ATTORNEYS

United States Patent Office 2,759,327
Patented Aug. 21, 1956

2,759,327

POWER PLANTS INCLUDING AT LEAST ONE GAS TURBINE, IN PARTICULAR FOR VEHICLES

Robert Huber, Bellevue, France, assignor to Societe d'Etudes et de Participations Eau, Gaz, Electricite, Energie, S. A., Geneva, Switzerland, a society of Switzerland Application November 13, 1952, Serial No. 320,331

Claims priority, application France November 17, 1951

7 Claims. (Cl. 60—39.15)

The present invention relates to power plants, in particular for vehicles such as motor cars, lorries, locomotives, tractors, self-propelled railway cars, and the like, including a gas turbine connected through a change speed device with a transmission shaft.

Its object is to provide a power plant of this kind which is better adapted to meet the requirements of practice than those used up to the present time.

It consists chiefly in providing this turbine, in addition to the wheel or wheels thereof which rotate in the forward direction, with at least one brake wheel fed separately with power gases to apply to the turbine shaft a torque in the reverse direction and in causing one of the parts which are actuated when shifting from a lower to a higher gear to cooperate with the element which controls the feed of power gases to said brake wheel so that this wheel is fed with power gases during this operation of the change speed device.

A preferred embodiment of my invention will be hereinafter described with reference to the accompanying drawing, given merely by way of example, and in which:

The only figure diagrammatically shows a power plant according to my invention mounted on a motor vehicle, for instance a lorry, and including a gas turbine and a free piston generator of gas under pressure.

Turbine 1 includes one or several wheels 2 serving to the normal, or forward, operation of the turbine and the inlet 3 through which are fed the gases which drive wheels 2 is connected through conduits 4 and 5 with the generator 6 of power gases. Preferably, this generator is a free piston generator including, as well known, a compressor portion and a power portion, this last mentioned portion being supplied with air compressed by the compressor portion and the power gases delivered by the generator through the discharge apertures of its power portion being constituted by a mixture of partly expanded combustion gases and scavenging air from the compressor portion.

Adjustment of the pressure and of amount of gases supplied by this generator, i. e. adjustment of the power thereof, is obtained through a suitable adjustment of the amount of fuel injected into the power portion of the generator. When this last mentioned portion works on the Diesel cycle, the amount of fuel injected into this portion is generally adjusted by means of an adjustment rod 7 acting in a known manner upon the injection pump 8 of the generator.

This adjustment rod is controlled by any control member actuated by the vehicle driver. This control member may be for instance a pedal 9 on which act, on the one hand the driver's foot and on the other hand a spring 10 urging the pedal toward the position of rest, shown by the drawing. A suitable link system 11 transmits the movement of pedal 9 to said adjustment rod, a play 12 being advantageously provided in this link system, whereby the movement of rod 7 which moves it away from the position corresponding to idling of the plant starts only after an initial displacement of pedal 9.

The movement of the wheels 2 of turbine 1, fixed on the shaft 13 thereof, is transmitted, through a speed reducing gear 14, a clutch 15 and a gear box 16 (including for instance two forward gear combinations and a reverse drive combination, obtained through the action of a sliding gear) to transmission shaft 17, which drives the vehicle wheels in the usual manner.

When shifting from a lower gear combination of gear box 16 to a higher gear combination, for instance from first to second gear, it is of course necessary, in order to obtain shockless gear shifting, to wait, before reengaging the clutch for the new gear combination until the shaft 13 of the turbine has undergone a suitable slowing down. If, for instance, the number of revolutions of the turbine shaft, when it is desired to shift from one gear to the other, is equal to about 35,000 revolutions per minute (maximum speed of the turbine), it is necessary to fait until the turbine has slowed down to about 18,000 revolutions before engaging the clutch. Due to the high kinetic energy of the turbine and to the low value of its internal frictions, the desired slowing down of the turbine, if obtained only by cutting off the feed of power gases to wheels 2 through conduits 4 and 5, would require some tens of seconds. Of course, such a long wait is practically impossible. In order to reduce this delay, according to my invention, I mount on turbine 1, preferably directly on the main shaft 13 thereof, a brake turbine wheel 18 arranged, when driven by power gases, to apply on shaft 13 a torque of a direction opposed ot that in which this shaft is driven by wheels 2 when power gases are fed thereto. Furthermore, I provide a distinct feed of gas to brake-wheel 18, by providing in the turbine casing a feed aperture 19 connected through a conduit 20 to the discharge conduit 5 of generator 6. Furthermore the feed of power gases to brake wheel 18 is controlled by means of a valve or shutter 21 adapted to be opened, so as to enable power gases to reach wheel 18, as one of the parts which are to be brought into play for shifting gears is actuated.

This arrangement may be designed in many different ways. For instance, valve 21 may open in response to the displacement undergone by the member (not shown), for instance a lever, which directly operates gear box 16, the connection between this member and valve 21 being such that power gases are fed to brake wheel 18 when said gear box operating member is in its neutral position.

I might also provide on the gear box operating member a supplementary hand-lever actuated by a pressure of the hand holding this control member to bring valve 21 into opened position. The feed of power gases to wheel 18 would produce a high braking torque, particularly great due to the high relative speed between the brake wheel turning in the direction opposed to its natural direction of movement and the gases which strike it.

However, according to an embodiment of my invention which seems to be particularly advantageous and which is that shown by the drawing, valve 21 is operated by the device for adjusting the amount of fuel fed to generator 6. An abutment 22 carried by rod 11, which is connected with pedal 9, cooperates with a lever 24 fixed on the axis 25 of rotary valve 21, this lever being applied against this abutment by a spring 23, weaker than spring 10.

When pedal 9 is released, which is the case during a gear shifting operation, and when, consequently, this pedal is in its position of rest shown by the drawing, abutment 22 brings lever 24 and shutter 21 into the position shown by the drawing, where power gases are supplied through conduit 20 and orifice 19 to wheel 18. This wheel 18 can therefore exert its braking effort, which makes it possible to change gear rapidly.

When the driver depresses pedal 9 in order again to accelerate the turbine, rod 11 and abutment 22 move toward the right and spring 23 brings lever 24 and valve 21 into the position for which this valve closes conduit 20, which eliminates the braking effect of brake wheel 18.

According to a particularly advantageous embodiment, when pedal 9 is in position of rest, as shown by the drawing, power gases are fed not only to brake wheel 18 but also to wheels 2, and the amounts of gases that are supplied simultaneously to wheels 2 and 18 are adjusted in such manner that the opposed torques which are thus created are at least approximately equal.

Such an arrangement, while imparting to the brake wheel an efficient braking effect, has the advantage, on the one hand of preventing, during gear shifting, a rotation of shaft 13 in the reverse direction and, on the other hand, keeping the turbine stationary or at most to permit but a very small movement thereof while the generator is being started, when pedal 9 is also in its position of rest.

The simultaneous feed of gases to wheels 2, on the one hand, and 18 on the other hand, is obtained, in the plant shown by the drawings, by an arrangement of conduits 4 and 20 with respect to valve 21 such that this valve is located between these two conduits and partly opens each of them when pedal 9 is in its position of rest.

It should also be noted that the gases, after they have passed through wheels 2 and/or 18 escape through a common exhaust conduit 26.

According to another feature of my invention, the brake wheel is used not only to ensure an approximate synchronizing of the gears of the gear box and thus to facilitate the working of this box when it is desired to change speed but to exert a braking effort on the wheels of the vehicle. For this purpose, valve 21 is further connected to a braking control member constituted, for instance, by a lever 27 pivotally mounted under the steering wheel 28 of the vehicle or at any other suitable place.

This lever 27 is connected to lever 24 by a transmission including a rod 29, a bell crank lever 30, a slotted member 31 in which is engaged one of the ends of lever 30, and a rod 32 rigid at one end with member 31 and pivotally mounted at its other end on lever 24.

When lever 27 is in the position shown in solid lines, it has no effect on lever 24 and shutter 21 and its elements are free, owing to slotted member 31, to move in accordance with the position of abutment 22.

On the contrary, if lever 27 is depressed into the position shown in dotted lines and if, at the same time, pedal 9 is in position of rest, which is natural when it is desired to exert a braking effort, shutter 21 is brought into a position in which it fully closes conduit 4 (and consequently cuts off the feed of power gases to the inlet 3 of wheels 2) and fully opens conduit 20 and therefore feeds power gases to brake wheel 18. The power gases thus exert a strong braking action which is transmitted, through transmission 17, to the wheels of the vehicle.

Thus I avoid free wheel running when the generator is working on no load and I obtain a strong braking effect by means of turbine 1, as if the plant included an ordinary piston engine.

In addition to this, it is possible, for the last mentioned position of lever 27, to exert a still higher braking effort by depressing pedal 9, which further increases the amount of gases which acts upon the brake wheel.

Owing to this braking action, it is possible practically to run down all hills without making use of the usual friction brakes acting directly upon the wheels. The power gases supplied by the generator when it is running on no load, generally exert a sufficient braking action, when the slopes have a normal value ranging from 5 to 7°. For more important slopes, it will be necessary to increase the feed of gases from the generator to the brake wheel.

At the end of the braking period, lever 27 is brought back to its initial position and the brake wheel acts only during gear shifting periods.

Brake wheel 18 might be mounted on a shaft distinct from shaft 13 and be connected thereto through suitable means (either with gears or not).

The gas turbine, instead of being supplied with gases from an auto-generator, might be fed from a rotary compressor driven by said turbine, combustion chambers being interposed between the outlet of the compressor and the inlet of the turbine.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A power plant which comprises, in combination, a gas turbine including a shaft, at least one turbine wheel fixed to said shaft and adapted to be driven by power gases in the forward direction, a brake turbine wheel connected to said shaft and adapted to be driven by power gases for applying to said shaft a torque in the reverse direction, a transmission shaft, a speed changing device inserted between said turbine shaft and said transmission shaft, said speed changing device including at least two intershiftable gear combinations for giving at will a low gear ratio or a high gear ratio between said two respective shafts, power plant control means arranged to be actuated when shifting said speed changing device from one gear combination to the other and means operatively connected with said power plant control means for supplying power gases both to said turbine brake wheel and to said first mentioned turbine wheel in response to a displacement of said control means for shifting said speed changing device from low gear to high gear combination.

2. A power plant which comprises, in combination, a gas turbine including a shaft, at least one turbine wheel fixed to said shaft and adapted to be driven by power gases in the forward direction, a brake turbine wheel also fixed to said shaft and adapted to be driven by power gases for applying to said shaft a torque in the reverse direction, a transmission shaft, a speed changing device inserted between said turbine shaft and said transmission shaft, said speed changing device including at least two intershiftable gear combinations for giving at will a low gear ratio or a high gear ratio between said two respective shafts, control means for adjusting the power supplied by said power plant, and means operatively connected with said control means for supplying power gases both to said turbine brake wheel and to said first mentioned turbine wheel in response to a predetermined displacement of said control means in the power reducing direction.

3. A power plant which comprises, in combination, a gas turbine including a shaft, at least one turbine wheel fixed to said shaft and adapted to be driven by power gases in the forward direction, a brake turbine wheel also fixed to said shaft and adapted to be driven by power gases for applying to said shaft a torque in the reverse direction, a transmission shaft, a gear box inserted between said turbine shaft and said transmission shaft, a gas generator for supplying power gases to said turbine, control means for adjusting the rate of delivery of said generator, and means operatively connected with said control means for connecting said gas generator with said turbine brake wheel in response to a displacement of said control means reducing the rate of delivery of said generator down to a predetermined value.

4. A power plant which comprises, in combination, a gas turbine including a shaft, at least one turbine wheel fixed to said shaft and adapted to be driven by power gases in the forward direction, a brake turbine wheel also fixed to said shaft and adapted to be driven by power gases for applying to said shaft a torque in the reverse direction, a transmission shaft, a gear box inserted between said turbine shaft and said transmission shaft, a free piston auto-generator for supplying power gases to said turbine, control means for adjusting the rate of delivery of said auto-generator, and means operatively connected with said control means for connecting said gas auto-generator with said turbine brake wheel in response to a displacement of said control means reducing the rate of delivery of said auto-generator down to a predetermined value.

5. A power plant which comprises, in combination, a gas turbine including a shaft, at least one forward turbine wheel fixed to said shaft and adapted to be driven by power gases in the forward direction, a brake turbine wheel also fixed to said shaft and adapted to be driven by power gases for applying to said shaft a torque in the reverse direction, a transmission shaft, a gear box inserted between said turbine shaft and said transmission shaft, a gas generator for supplying power gases to said turbine, control means for adjusting the rate of delivery of said generator, distinct conduits extending between the output end of said generator and said forward turbine wheel and said brake turbine wheel respectively, valve means in said conduits normally closing the conduit leading to said brake turbine wheel while leaving the other conduit open, and means operatively connected with said control means for operating said valve means to open both of said conduits in response to a displacement of said control means reducing the rate of delivery of said generator down to a predetermined value.

6. A vehicle power plant according to claim 3 in which the means for adjusting the rate of delivery of said gas generator include a control member to be operated by the vehicle driver, fuel injection adjusting means for said generator, and a transmission between said control member and said fuel injection adjusting means, said transmission including a lost motion connection arranged to enable said control member to move some distance in the direction corresponding to an increase of the fuel injection before actually actuating said fuel injection adjusting means.

7. A vehicle power plant according to claim 1 further including independent means operative by the vehicle driver for feeding at any time power gases to said brake turbine wheel for braking said vehicle.

References Cited in the file of this patent

UNITED STATES PATENTS

| | | |
|---|---|---|
| 962,511 | Kincaid | June 28, 1910 |
| 2,372,686 | Sedille | Apr. 3, 1945 |
| 2,434,160 | Hoffman | Jan 6, 1948 |

FOREIGN PATENTS

| | | |
|---|---|---|
| 188,043 | Great Britain | Oct. 30, 1922 |